US006964223B2

(12) United States Patent
O'Loughlin (10) Patent No.: US 6,964,223 B2
(45) Date of Patent: Nov. 15, 2005

(54) PLUNGER FOR BREWING A DRINK (76) Inventor: Nick O'Loughlin, 5/210 Carr Place, Leederville WA 6007 (AU)

( * ) Notice: Subject to any disclaimer, the term of this patent is extended or adjusted under 35 U.S.C. 154(b) by 0 days.

(21) Appl. No.: 10/398,751

(22) PCT Filed: Oct. 11, 2001

(86) PCT No.: PCT/AU01/01283

§ 371 (c)(1),
(2), (4) Date: Apr. 10, 2003

(87) PCT Pub. No.: WO02/30249

PCT Pub. Date: Apr. 18, 2002

(65) Prior Publication Data

US 2004/0011205 A1    Jan. 22, 2004

(30) Foreign Application Priority Data

Oct. 11, 2000   (AU) .................................. 65460/00

(51) Int. Cl.⁷ .............................................. A47J 31/18
(52) U.S. Cl. ......................... 99/297; 99/302 P; 99/319; 426/433
(58) Field of Search ............................... 99/297, 302 P, 99/318, 319, 317, 320, 323; 426/433, 434, 426/435

(56) References Cited

U.S. PATENT DOCUMENTS

| 529,349 | A | * | 11/1894 | Adams ........................ 99/319 |
| 678,692 | A | * | 7/1901 | Roth ........................... 99/319 |
| 1,701,194 | A | * | 2/1929 | Rosenstein et al. ........... 99/285 |
| 4,181,071 | A | | 1/1980 | Outlaw |
| 5,478,586 | A | | 12/1995 | Connor |
| 5,799,566 | A | * | 9/1998 | Breinlinger et al. .......... 99/320 |
| 5,932,098 | A | * | 8/1999 | Ross .......................... 210/337 |

FOREIGN PATENT DOCUMENTS

| DE | 26 51 610 A1 | 5/1978 |
| DE | 298 15 636 U1 | 2/2000 |
| NL | 9001463 A | 1/1992 |
| WO | 95/15886 | 6/1995 |
| WO | 97/11626 | 4/1997 |
| WO | 98/47596 | 10/1998 |
| WO | 01/54549 A1 | 8/2001 |

* cited by examiner

Primary Examiner—Reginald L. Alexander
(74) Attorney, Agent, or Firm—Burns, Doane, Swecker & Mathis, L.L.P.

(57) ABSTRACT

Plunger (10) for brewing a drink in a cup (12) includes two main components, a filter disc (20) and a frame (22). The filter disc (20) is shaped to extend across and abut an inside surface (24) of the cup (12). The frame (22) is dimensioned so that it can be wholly inserted into the cup (12) to be disposed below a mouth (18) of the cup. This allows a drink such as coffee or tea to be brewed in the cup from which it is to be consumed without the plunger (10) interfering with the drinking of the drink. The disc (20) is supported on the frame (22) to slide along upright posts (22). Thus the disc (20) can be pushed toward the bottom or (14) of the cup (12) that contain particulate materials such as coffee grounds or tea leaves used in brewing the drink. A heat shield (58) may be also supported on the frame (22) to minimise the rate of heat loss of a hot drink brewed in the cup (12) using the plunger (10).

42 Claims, 7 Drawing Sheets

PLUNGER FOR BREWING A DRINK

FIELD OF THE INVENTION

The present invention relates to a plunger for brewing a beverage such as, but not limited to, coffee and tea.

BACKGROUND OF THE INVENTION

There are several well-known devices and processes for brewing coffee.

Arguably, commercial expresso machines of the type found in cafes and coffee shops produce the best coffee. While some manufacturers are now making small expresso coffee machines for domestic use, penetration into the domestic market is limited due to the relatively high cost of the machines.

Drip type coffee brew machines are in relatively common domestic use for making coffee. This type of machine relies on heated water dripping through fine ground coffee beans held within a filter. The water saturates the coffee grounds and after passing through the filter falls into an underlying jug which typically sits on a heated base. This type of machine makes good quality coffee although if care is not taken, over an extended period, the heat applied to the jug will "cook" the coffee thereby reducing its quality.

Percolators provide yet another device for making coffee. A typical percolator is provided with an upper and lower reservoir separated by a replenishable filter basket holding ground coffee. The lower reservoir of the percolator is heated on a stove causing the water to bubble through the basket on its passage to the upper reservoir. The percolator needs to be watched carefully and removed from the heat source after all the water has risen from the lower reservoir to the upper reservoir.

Recently "plunger coffee" has become popular. A typical plunger coffee maker comprises a glass vessel and a plunger having a filter mesh supported at a lower end of a stem, the upper end of the stem being provided with a handle and a heat shield. When making plunger coffee, initially coffee grounds are spooned into the vessel and the vessel filled with hot water to a level below the top of the vessel. The filter portion of the plunger is inserted into the vessel at a position above the level of the water. The heat shield is then slid down the stem and engaged with the top of the vessel. The plunger is maintained in this position for a period of time to allow the ground coffee to be saturated/infused. Thereafter, the handle is depressed pushing the filter to the bottom of the vessel trapping undissolved coffee grounds between the filter and the bottom of the vessel. The coffee can then be poured from the vessel to a cup and mixed with sugar, milk or cream as required.

Perhaps the overwhelmingly common way of making coffee is to use "instant coffee grounds" spooned from ajar into a cup into which hot water is added. The instant coffee grounds are made from highly processed coffee beans so that they dissolve and for this reason provide a potentially poorer taste.

SUMMARY OF THE INVENTION

It is an object of the present invention to provide a relatively simple and inexpensive plunger for use in quickly and conveniently making a brewed drink such as tea or coffee which can be used in a variety of different vessels and allows the user to drink directly from the vessel in which the plunger is disposed.

According to the present invention there is provided a plunger for use in brewing a drink from a particulate substance and a liquid held in a vessel, said vessel having a bottom wall, a side wall extending upward from said bottom wall and a mouth extending about said side wall through which said plunger can be inserted and withdrawn, said plunger including at least:

filtering means shaped to extend across and abut an inside surface of said side wall of said vessel, said filtering means provided with a plurality of pores or holes of dimension to substantially prevent passage therethrough of said particulate substance; and, handling means coupled to said filtering means by which said plunger can be manipulated, said plunger dimensioned so that when said plunger is pushed to a lowest position within said vessel, said handling means is disposed below said mouth.

Preferably said handling means includes a frame provided with at least one upright post along which said filtering means can slide.

Preferably said frame includes first and second opposite ends between which said at least one post extends wherein said first and second ends retain said filtering means on said at least one upright post and the sliding of said filtering means along said at least one upright post is limited by said first and second ends.

Preferably at least one of said first and second ends include engaging means for engaging an implement or a users finger for withdrawing said plunger from said vessel.

Preferably said engaging means includes a plurality of circumferentially spaced apart, radially inwardly directed projections between which said implement can be engaged.

Preferably said first and second ends are each in the general configuration of a ring having a common axis which extends substantially parallel to said at least one upright post.

Preferably said filtering means includes a carrier and a filter screen supported by said carrier.

Preferably said carrier includes first and second parts between which said filter screen is retained.

Preferably said carrier includes an outer circumferential rim provided with a plurality of apertures through each of which a respective one of said at least one upright post extends.

Preferably said carrier includes a plate for receiving an implement for pushing said filtering means toward said bottom of said vessel.

Preferably said plate is concavely shaped.

Preferably said plate is a first of first and second plates, where said first and second plates are diametrically opposed on opposite sides of said carrier.

Preferably said carrier includes a plurality of spokes which extend from said rim to said first and second plates.

Preferably said plunger includes a heat shield disposed over said filtering means and supported by said frame for reducing the rate of heat loss of a hot beverage brewed using said plunger.

Preferably said heat shield includes first and second disc elements located on opposite side of said filtering means.

Preferably each of said disc elements includes a plurality of spaced apart openings, wherein said first and second disc elements are juxtaposed so that the openings of said first disc element are radially offset with respect to said openings of said second disc element.

Preferably said filtering means further includes a seal extending circumferentially about said carrier to form a seal between said carrier and said side wall of said vessel.

According to a further aspect of the present invention there is provided a plunger for use in brewing a drink from a particulate substance and a liquid held in a vessel, said vessel having a bottom wall, a side wall extending upward from said bottom wall, and a mouth extending about the side wall through which said plunger can be inserted and withdrawn; said plunger including at least:

filtering means shaped to extend across and abut an inside surface of said side wall of said vessel, said filtering means provided with a plurality of pores or holes dimensioned to substantially prevent the passage therethrough of said particulate substance; and, a frame to which said filtering means is coupled, said frame dimensioned so that when said plunger is pushed to a lowest position inside said vessel, said frame is disposed below said mouth of said vessel.

BRIEF DESCRIPTION OF THE DRAWINGS

Embodiments of the present invention will now be described by way of example only with reference to the accompanying drawings in which:

FIG. 10C is a view of section AA taken through the part depicted in FIG. 10B; and, FIG. 10D is a side view of the part depicted in FIG. 10A.

DETAILED DESCRIPTION OF PREFERRED EMBODIMENT

Figure 1:
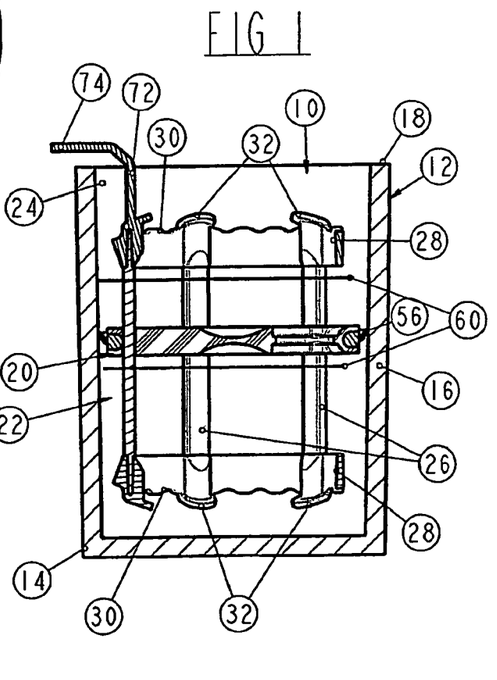
FIG. 1 is a section view of an embodiment of the plunger disposed in a vessel.

Referring to the accompanying drawings, and in particular FIG. 1, a plunger 10 is depicted for use in brewing a drink such as tea or coffee in a vessel such as a mug or cup 12. The cup 12 is of conventional configuration having a bottom wall 14, a side wall 16 extending upward from the bottom wall 14 and a mouth 18 through which the plunger 10 can be inserted or withdrawn. The plunger 10 includes two main components, a filtering means in the form of filter disc 20 and a handling means in the form of frame 22. The filter disc 20 is shaped to extend across and abut an inside surface 24 of the side wall 16 and is provided with a plurality of pores or holes dimensioned to substantially prevent passage therethrough of the particulate substance such as coffee grounds or tea leaves used for brewing a drink in the cup 12. The filter disc 20 is coupled to the frame 22, the frame providing a means by which the plunger 10 can be manipulated. The plunger 10 is dimensioned so that when pushed to a lowest position inside the cup 12 the frame is disposed below the mouth 18 and is clearly depicted in FIG. 1.

Figure 2:
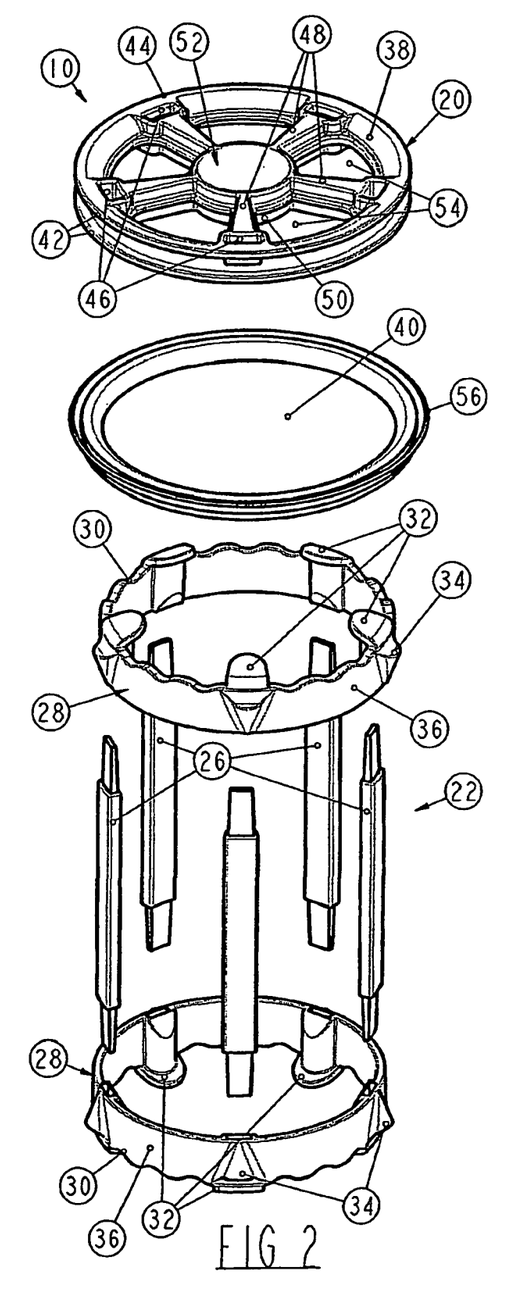
FIG. 2 is a perspective exploded view of the plunger.
Figure 3:
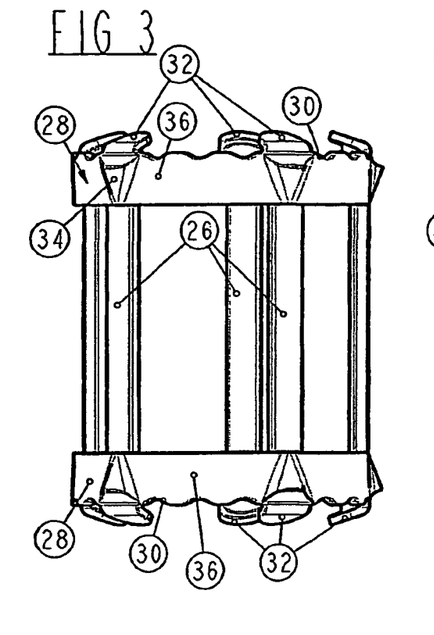
FIG. 3 is a side view of a frame incorporated in the plunger.
Figure 4:
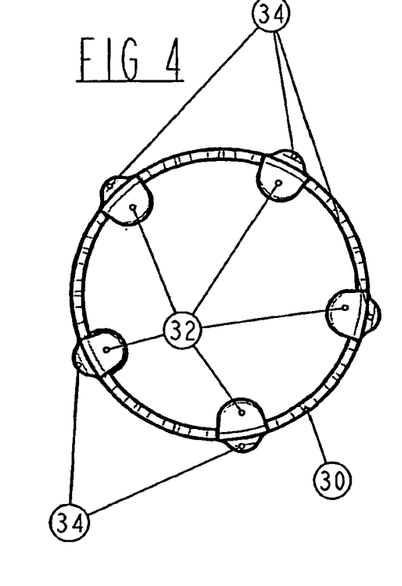
FIG. 4 is a bottom view of the frame depicted in FIG. 3.
Figure 5:
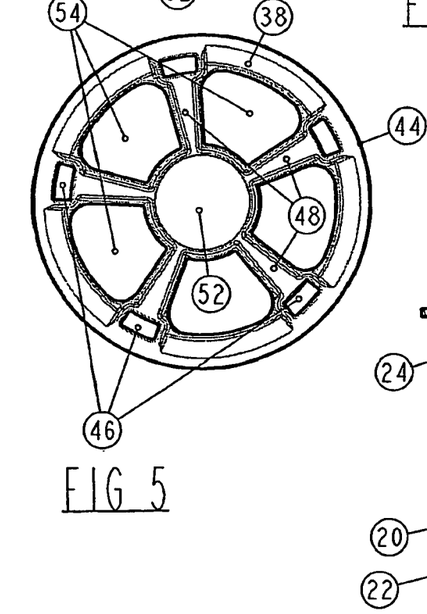
FIG. 5 is a plan view of a carrier incorporated in the plunger.

Referring to FIGS. 24, the frame 22 is provided with five upright posts 26 along which the filter discs 20 can slide. The frame 22 also includes first and second opposite ends in the form of rings 28 at opposite ends of the posts 26 which retain the filter disc 20 on the posts 26. It is readily apparent from the drawings, the rings 28 have a common axis which extends parallel to the posts 26. The rings 28 limit the sliding motion of the filter disc 20 along the posts 26. Each of the rings 28 is also provided about its respective circumferential edge 30 with engaging means in the form of circumferentially spaced apart radially inwardly directed projections or tabs 32 for engaging an implement such as a teaspoon, or a users finger, for withdrawing the plunger 10 from the cup 12. A plurality of radially extending nibs 34 are also provided on an outer circumferential surface 36 of each ring 28 which assist in centralising the plunger 10 within the cup 12. In the illustrated embodiment, the edge 30 of each ring 28 is also formed with a sinusoidal profile having three crests between adjacent projections 32.

In construction of the frame 22, at least one of the rings 28 is formed separately of the posts 26 to allow the filter discs 20 to be initially mounted on the posts 26. Thereafter the separately formed ring 28 is glued or heat welded to the posts 26 so as to permanently retain the filter disc on the frame 22. Most conveniently, one of the rings 28 is formed integrally with the posts 26 with the remaining ring 28 being separately formed.

Referring particularly to FIG. 2, the filter disc 20 comprises a carrier 38 and a filter screen 40 which is supported by the carrier 38. More particularly, the carrier 38 is formed of first and second identical parts 42 between which the filter screen 40 is sandwiched and positively retained for example by gluing.

Typically the filter screen 40 will be in the form of a stainless steel or nylon mesh.

The carrier 38, and each of the first and second parts 42 includes an outer circumferential rim 44 provided with a plurality of spaced apart apertures 46 through which respective posts 26 pass. Spokes 48 extend radially from the rim 44 and join at a central hub 50. Separate concavely shaped plates 52 are provided on each side of the hub 50 for receiving an implement, such as a spoon, for pushing the filter disc 20 toward the bottom wall 14 of the cup 12.

Large voids 54 are formed between radially adjacent spokes 48 and the rim 44 across which the filter screen 40 extends. Thus when the filter disc 20 is pushed in a downward direction when in a cup 12 filled with say water and coffee grounds, the water is able to pass through the portions of the filter screen 40 extending across the voids 54.

In order to prevent particulate matter such as coffee grounds or tea leaves from passing about the outer circumferential surface of the rim 44, a circumferential seal 56 extends circumferentially about the carrier 38 between the parts 42. The seal can be in the form of a radial extension of the filter screen, so that an outer circumferential edge of the screen 40 extends radially beyond the carrier 38. Alternately the seal may be a separate component.

Figures 6, 7:
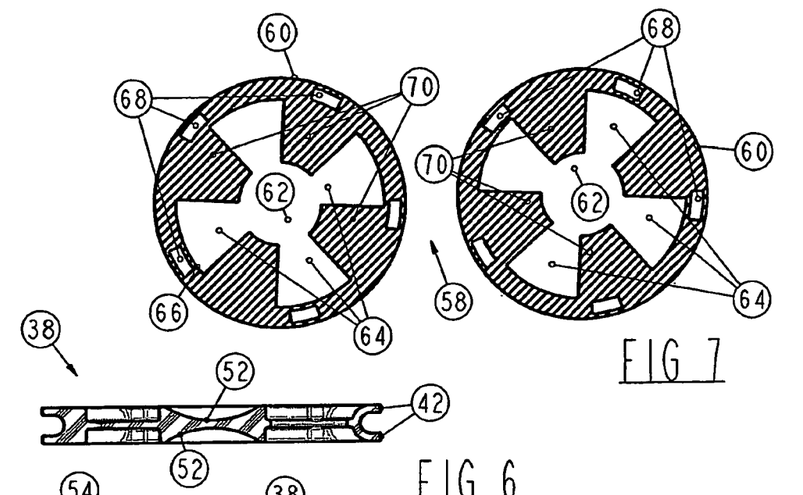
FIG. 6 is a side view of the carrier depicted in FIG. 5.
FIG. 7 is a plan view of a heat shield incorporated in the plunger.

FIG. 7 depicts an optional heat shield 58 which may be incorporated into the plunger 10 to assist in reducing the rate of heat loss of a hot beverage brewed using the plunger 10. The heat shield 58 is in the form of two disc like elements 60 of identical configuration. Each disc like element (hereinafter referred to in general as "disc") 60 includes a central aperture 62 and a plurality of circumferentially spaced apart openings 64. The openings 64 are in the general shape of a sector and extend radially outwardly from the central aperture 62 to an inner circumferential edge 66 of each disc 60. Five spaced apart apertures 68 are also formed in a peripheral band of each disc 60 through which respective posts 26 can pass. The openings 64 are separated by sector shaped webs 70.

Referring to FIG. 1, when the heat shield 58 is incorporated, separate discs 60 are mounted on the posts 26 on opposite sides of the filter disc 20. The central apertures 62 are located and dimensioned to allow access to the plates 52 of the filter disc 20. Further, the discs 60 are juxtaposed relative to each other so that the openings 64 of one disc 60 are radially offset with respect to the opening 64 of the other disc 60. Indeed, the degree of offset is such that the webs 70 of one disc 60 wholly overlie the opening 64 of the other disc 60.

When the heat shield 58 is incorporated, during the fabrication of the plunger 10, respective discs 60 are mounted onto the posts 26 before and after the filter disc 20.

FIG. 1 further depicts an additional optional feature of the plunger 10, namely a handle 72 which can be clipped or otherwise attached to the frame 20 so as to extend from either of its axial ends. The handle 72 is formed with a hooked or curved free end 74 which may extend over the mouth 18 of the cup 12.

As will be appreciated from the above description and the enclosed drawings, the plunger 10 has a symmetrical construction and can be used with either of its axial ends 28 nearest the bottom wall 14 of the cup 12. When the plunger 10 is used for example to make brewed coffee, a quantity of coffee grounds is deposited into the cup 12 with the plunger 10 removed. Thereafter, hot water is poured into the cup 12 to a level below the mouth 18. The grounds and water may then be stirred to assist in infusion of the coffee grounds. The plunger 10 is then inserted into the cup 12. Particularly if the heat shield 58 is incorporated, the plunger 10 may be pushed by hand to a level where a lower surface of the disc 20 is at approximately the level of the water within the cup 12. After sufficient time for infusion to occur, the plunger 10 can then be pushed further down within the cup 12 until a lower one of the ends 28 is pressed to bottom wall 14 and the disc 20 is slid along the posts 26 until it abuts that ring 28. This is achieved by placing, for example, a teaspoon on one of the plates 52 and simply pushing downwardly. As the filter disc 20 slides downwardly along the posts 26 toward the bottom wall 14 the brewed coffee is able to pass through the filter screen 40 but the coffee grounds are retained between the filter disc 20 and the bottom wall 14. The brewed coffee can then be drunk directly from the cup 12 without the need to remove the plunger 10. Of course, if sugar, milk, cream or other additions are required they can be simply added at this time and stirred into the brewed coffee using a conventional teaspoon.

Once the coffee has been consumed, the plunger 10 can be removed either directly by hand by simply reaching into the cup and gripping the frame 22, or alternately by using a teaspoon to hook beneath adjacent projections 32 and pulling upwardly on the teaspoon to pull the plunger 10 from the cup 12. Engagement of the teaspoon is achieved by inserting the teaspoon in a side-on fashion between adjacents projections 32 and then turning the spoon so that shoulders of the receptacle portion of the spoon on opposite sides of its handle lie beneath respective adjacent projections 32.

This allows for the convenient making of a brewed drink such as coffee or tea in the cup from which it is to be consumed. It further allows the combination of the plunger 10 and cup 12 to be used as a self-brewing travel mug in which a person can brew, drink in a cup and then take it with them, for example in a car or other vehicle. Further, the plunger 10 is not limited to use in a specific custom designed mug or cup. Rather, it can be used in any conventional cup or mug having an inner diameter of the size about the same as the diameter of the seal 56 formed about the filter disc 20.

FIGS. 8A–8E depict a further embodiment of the plunger 10. In describing this embodiment, features of the same or similar construction and/or function as depicted in relation to the embodiment depicted in FIGS. 1–7 are denoted by the same reference numbers. However, for the sake of clarity the embodiment depicted in FIGS. 8A–8E is hereinafter referred to as plunger 10'.

The most significant difference in the embodiment of the plunger 10' in comparison with the plunger 10 is the inclusion of an agitator 76 which is rotatably supported on the filter disc 20. The agitator 76 is provided with a main body 78 which includes an upper cylindrical portion 80 and a contiguous frusto-conical portion 82. The cylindrical portion 80 is provided on its upper surface 84 with a cross shaped cut out or recess 86 for receiving the blade of a teaspoon. Four paddles or fins 88 extend radially outwardly from an outer surface of the body 78. The agitator 76 is rotatably coupled to the filter disc 20 by a pin 90 which extends axially of the filter discs 20. A lower end of the pin 90 is coupled, for example by way of a screw thread to the central hub 50 of the carrier 38. An opposite end of the pin 90 is formed with an enlarged head 92 which sits within a correspondingly shaped internal cavity formed in the agitator 76.

Thus, when the plunger 10' is in use, in order to depress the filter disc 20 the blade of a spoon is inserted into one arm of the cross shaped cut out or recess 86. Once the filter disc 20 has been pushed as fir as possible down along the posts 26, the contents of the mug 12 can be stirred by simply rotating the handle of a spoon already engaged in the cross shaped recess 86.

Figures 8A, 8D:
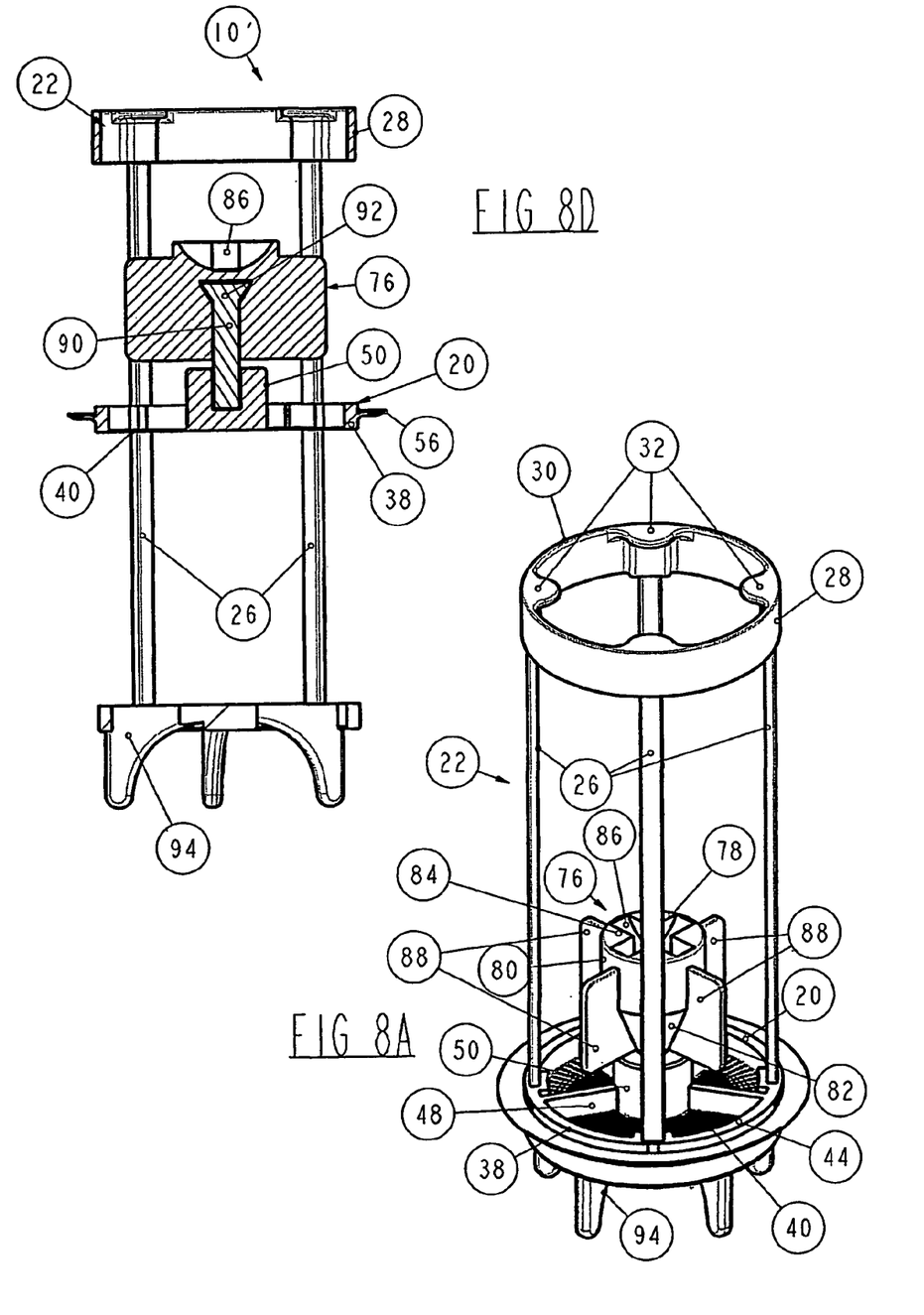
FIG. 8A is a perspective view of a second embodiment of the plunger.
FIG. 8D is a view of the plunger depicted in FIGS. 8A–8C, taken through AA of FIG. 8C.
Figures 8B, 8C:
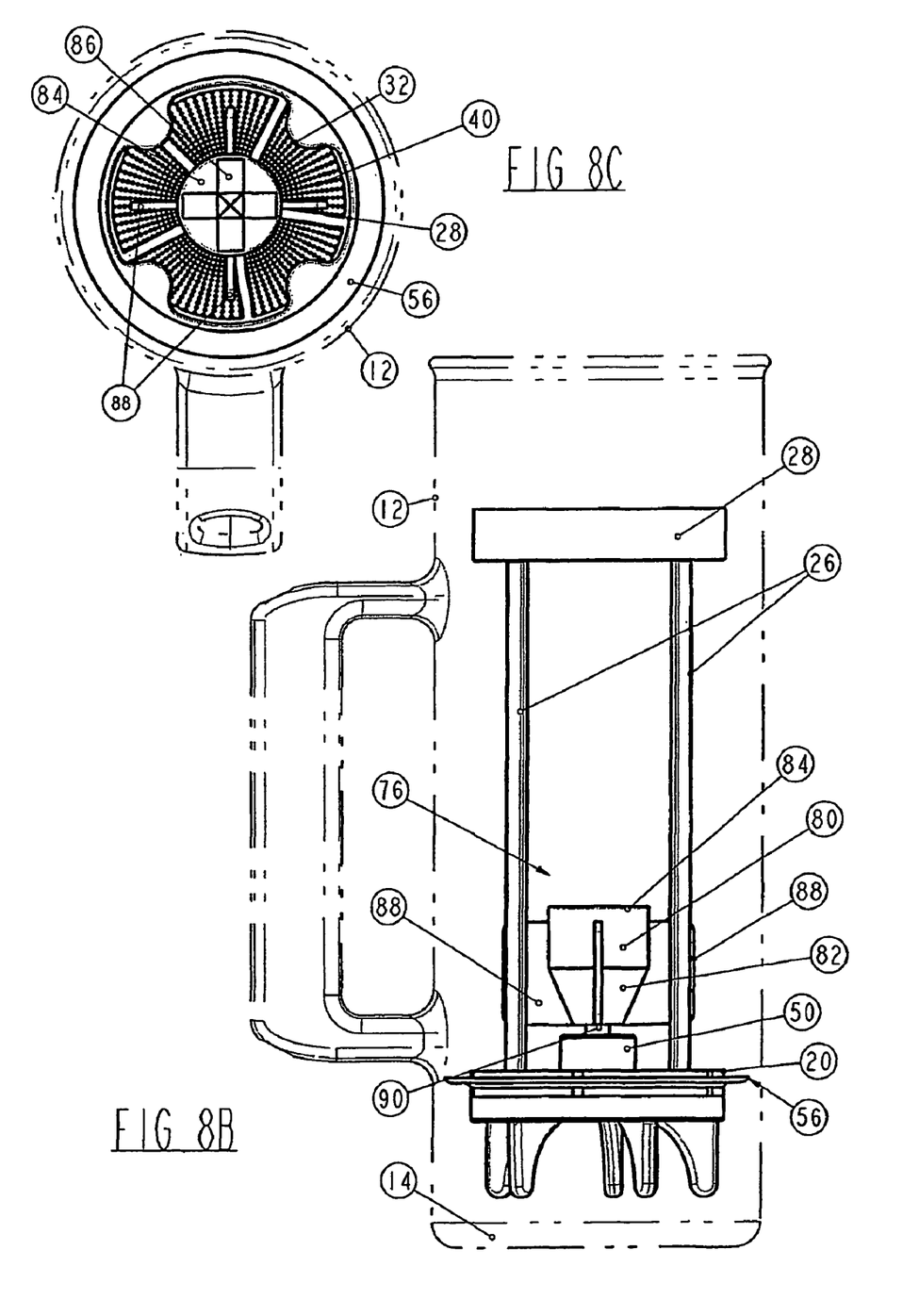
FIG. 8B is a side view of the plunger depicted in FIG. 8A within a mug.
FIG. 8C is a top view of the plunger depicted in FIG. 8B.
Figure 8E:
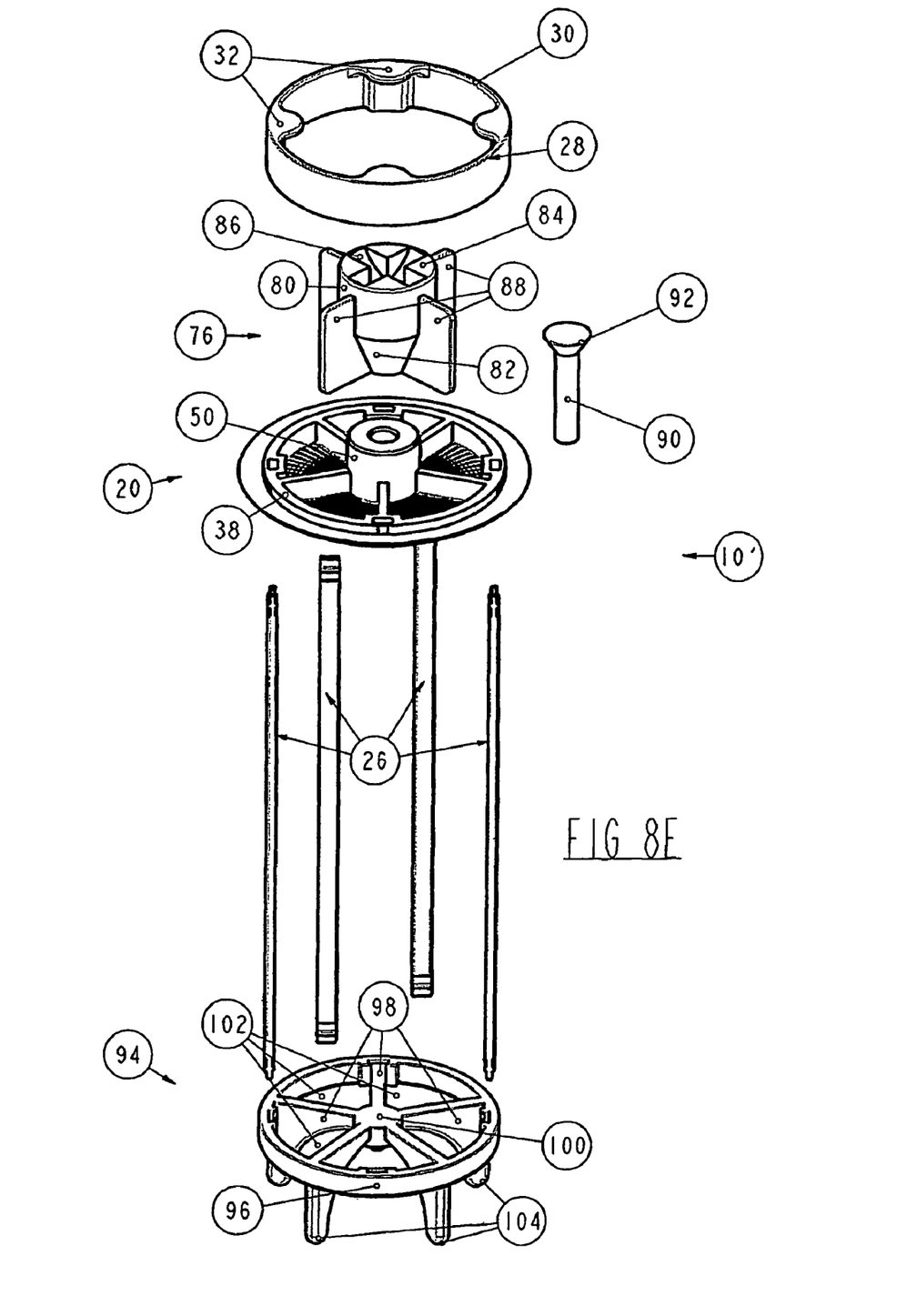
FIG. 8E is an exploded view of the plunger depicted in FIG. 8A.

A further difference between the plunger 10' and the plunger 10 is that opposite ends of the frame 22 are not of identical construction as in the plunger 10. Rather in plunger 10', an upper end of the frame 22 is formed by a ring 28 of similar though not identical form to the ring 28 of plunger 10. (The main differences here being that the ring 28 in plunger 10' has a planar rather than sinusoidal upper edge 30, and is provided with four rather than five projections 32). However, at the lower end of the frame 22 a base 94 is provided instead of another ring 28. Referring to FIG. 8E, the base 94 is in the form of a ring 96 provided with a plurality of radially extending spokes 98 that converge and couple to a central hub 100. Large voids or spaces 102 are provided between adjacent spokes 98. Depending from a lower face of the ring 96 is a plurality of legs 104 which contact the base 14 of the cup 12 when the plunger 10' is in use. The posts 26 snap fit or otherwise fix, at opposite ends, in the ring 28 and the base 94.

Save for the configuration of the central hub 50, the filter disc 20 and associated carrier 38 is of substantially the same construction as that described in relation to the plunger 10 depicted in FIGS. 1–7. However here, the seal 56 is separate from the filter screen 40. Further while the seal 56 extends centrally from the carrier 38 the screen 40 is disposed on an underside of the carrier 38.

When the plunger 10' is used, coffee grounds or tea leaves are placed at the bottom of the cup 12 and hot water added. Thereafter the frame 22 is gripped by hand over the ring 28 and pushed into the cup 12 with the filter disc 20 initially near the ring 28. It is not necessary that the plunger 10' be pushed by hand at this point in time to the extent that the legs 104 touch the base 14. Thereafter, the blade of the spoon can be inserted into one arm of the cross shaped recess 86 to push the filter disc 20 along the posts 26 toward the base 94. This action can also drive the frame 22 home, placing the legs 104 in contact with the base 14 if not previously in contact. The beverage within the cup 12 may then be stirred by rotating on the handle of the spoon causing the agitator 76 to rotate clockwise and anti-clockwise about a pin 90. Of course, sugar, cream or other additives can also be placed in the cup 12 and stirred in by a similar action.

Figures 9A, 9B, 9C:
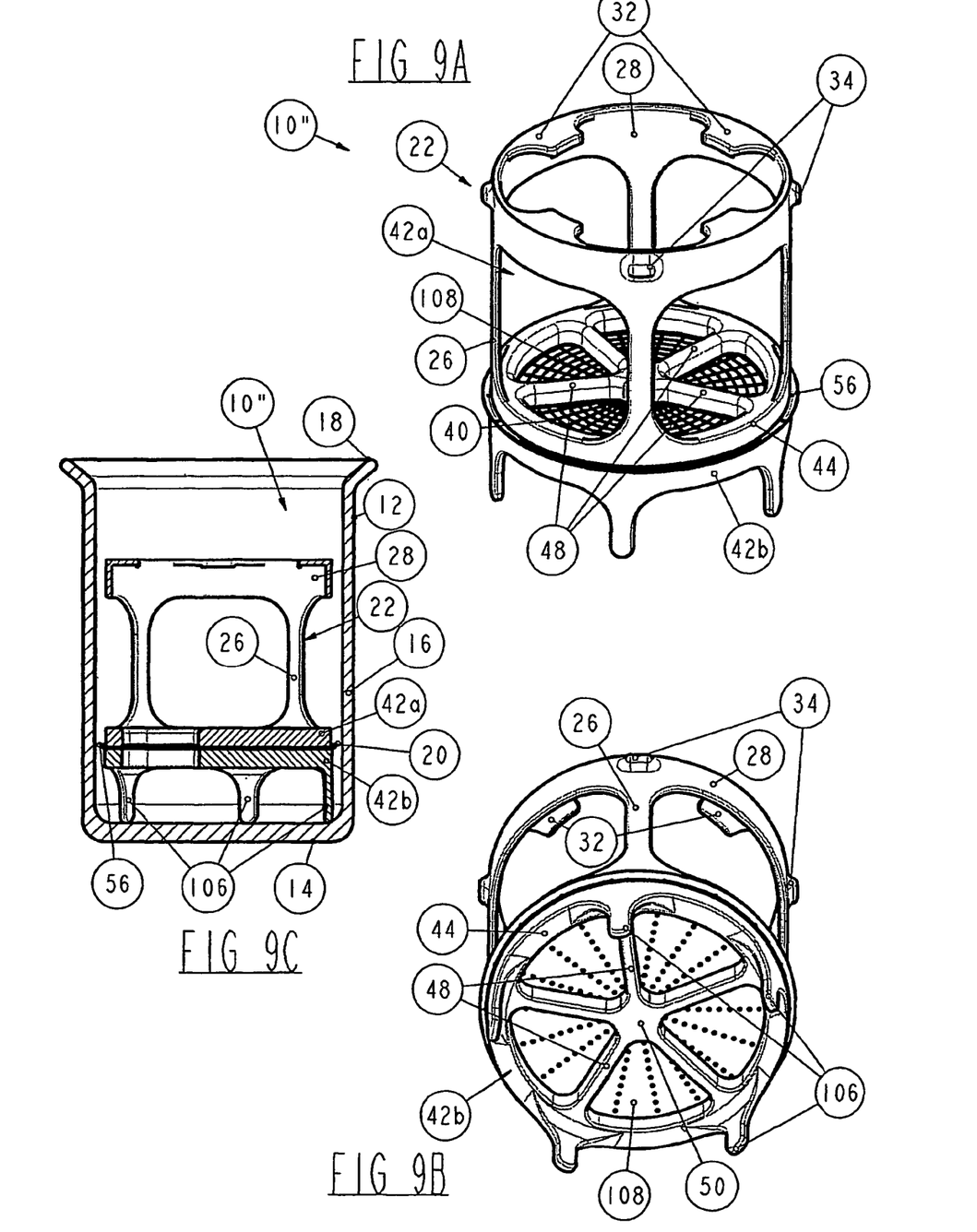
FIG. 9A is a perspective view of a further embodiment of the plunger.
FIG. 9B is a perspective view from the bottom of the plunger depicted in FIG. 9A.
FIG. 9C is a cross-sectional view of the plunger depicted in FIGS. 9A and 9B when disposed in a cup.

FIGS. 9A–9C depict a further simplified embodiment of the plunger 10". In this embodiment, the filter disc 20 is fixed to a lower end of the frame 22 rather than being slidable along the posts 26. In this regard, the filter disc 20 is of a substantially similar construction to that depicted in the embodiment of the plunger 10 shown in FIGS. 1–7 and replaces one of the rings 28 of the frame 22. The filter disc 20 is composed of two parts 42a and 42b which are of a generally similar construction to the parts 42 depicted in FIG. 2 although, obviously not identical and further, differ in construction from each other. The part 42a is provided with a circumferential rim 44 from which spokes 48 radially extend inwardly to converge at a central hub 50. Unlike the part 42 depicted in FIG. 2 however the part 42a does not include the apertures 46 (and, neither does the component 42b), since the filter discs 20 in the plunger 10" does not slide along the post 26. Further, the hub 50 in the part 42a does not support plate 52 as shown in the embodiment in FIG. 2. Nevertheless, the hub 50 in part 42a may be provided with a concave depressing for locating a spoon or other implement to assist in depressing the plunger 10" into the cup 12.

The part 42b is of similar construction to the part 42a with the exception that the hub 50 does not include a depression and, that the rim 44 of the part 42b is provided with a plurality of depending legs 106.

When the plunger 10" is in use, the legs 106 may be located against the base 14 of the cup 12.

In a further variation from the embodiment of the plunger 10, in the plunger 10", the filter disc 20 includes a filter protection mesh 108 disposed between the parts 42a and 42b with the mesh 108 suitably sized and disposed above the screen 40 to protect the screen from damage from an implement such as a spoon. The filter protection mesh 108 can be in the form of a stainless steel or nylon mesh and extends radially beyond the rim 44 of the parts 42a and 42b to form the seal 56. Alternately the seal 56 may be a separate component.

When the plunger 10" is in use, coffee grounds or tea leaves are placed in the mug 12 which is then filled with hot water. Thereafter, the plunger 10" can be gripped by the ring 28 and initially pushed into the cup 12 with the ring 28 disposed either above or below the mouth 18 but in any event the seal 56 is typically above the level of water within the cup 12. After sufficient time for brewing has elapsed, the plunger 10" can be pushed further into the cup 12 so that the legs 106 abut the bottom wall 14 by using an implement such as a spoon pressing on the hub 50 of the part 42a or on the filter protection mesh 108. Milk, sugar or other additions can then be placed into the cup 12 and stirred in using a spoon.

FIGS. 10A–10D depict an alternate configuration of the parts 42 which constitute the carrier 38 depicted in FIGS. 1–7. With this particular embodiment, each part 42 is in the is form of a perforated disc formed with a plurality of holes 54'. The part 42 includes an integrated central crater like structure 53 which defines the concave plate 52 for receiving implements such as a teaspoon. As in the previously described embodiments, each part 42 is provided with a plurality of apertures 46 at its peripheral rim 44 through which the posts 26 can pass.

Figure 10A:
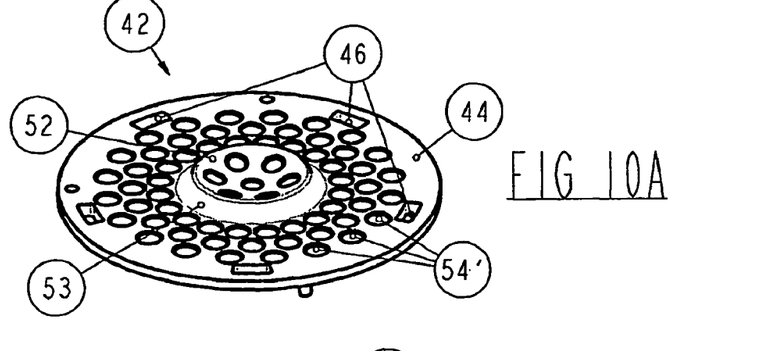
FIG. 10A is a perspective view of a further embodiment of a part of a carrier incorporated in the plunger.
Figure 10B:
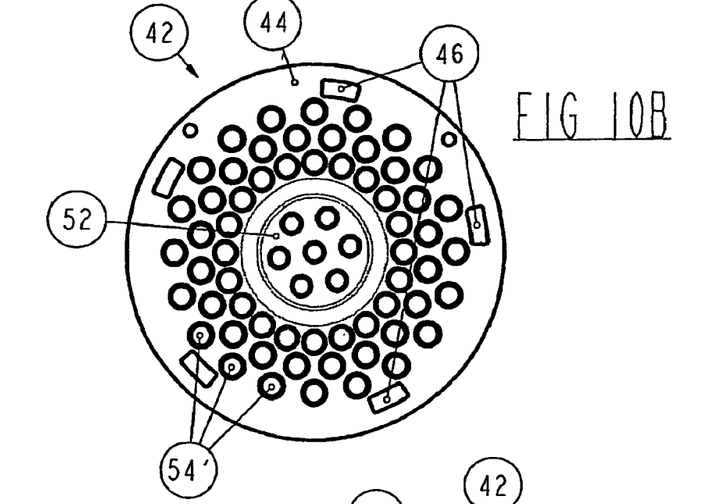
FIG. 10B is a plan view of the part depicted in FIG. 10A.
Figures 10C, 10D:
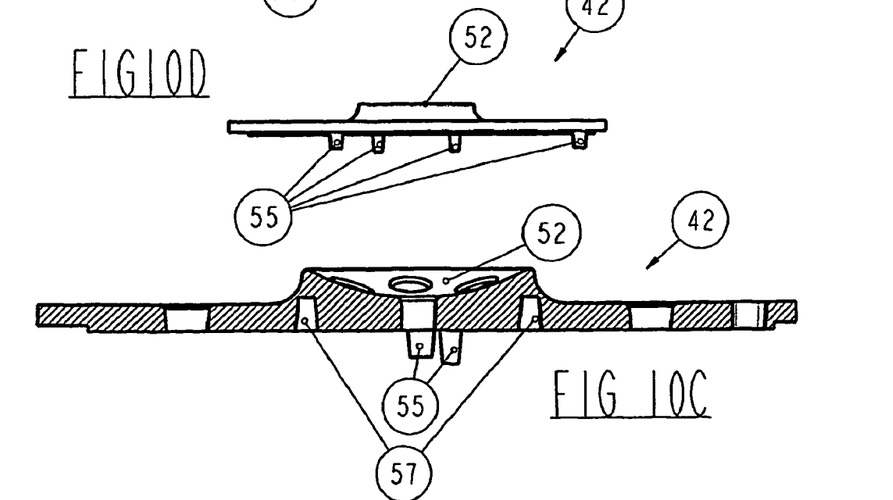

Referring in particular to FIGS. 10C and 10D, part 42 is provided with a plurality of depending teeth 55 and complimentarily shaped sockets 57. When the filter disc 20 is constructed using the parts 42, the teeth 55 of each part 42 locks or otherwise fixes into the sockets 57 of the other part 42. A filter screen (not shown) is clamped between the two parts 42 form the filter discs 20. In this embodiment, the holes 54' serve two functions. Firstly, to allow water to pass through the sandwiched filter screen as the filter disc 20 is pushed toward the bottom wall 14 of the cup 20. The additional function of the holes 54' is to protect the sandwiched filter screen from being damaged by implements such as a teaspoon.

It is envisaged that the various embodiments of the plunger can be made from plastics materials, or other microwave "safe" materials so that the plungers can be placed in a microwave oven.

All modifications and variations that would be obvious to a person of ordinary skill in the art are deemed to be within the scope of the preset invention the nature of which is to be determined from the above description and the appended claims.

What is claimed is:

1. A plunger for brewing a drink from a particulate substance the plunger comprising:
   a filter screen provided with a plurality of holes or pores dimensioned to substantially prevent the passage therethrough of the particulate substance;
   a frame provided with a first end and an axially opposed second end, the first end comprising a ring, and a plurality of posts extending from a periphery of the ring and coupling the ring to the second end;
   a filter disc coupled to the frame and supporting the filter screen, the filter disc adapted to receive an implement to push the plunger to a bottom of a vessel; and
   a particle seal extending circumferentially about the filter disc to prevent said particulate substance from passing about an outside of said frame.

2. A plunger according to claim 1 wherein the frame comprises a plurality of nibs on an outer circumferential surface of the frame.

3. The plunger according to claim 1 wherein the filter disc comprises a carrier that supports the filter screen.

4. The plunger according to claim 3 wherein the carrier comprises first and second parts between which the filter screen is retained.

5. The plunger according to claim 4 wherein an upper end of the frame comprises a plurality of spokes that extend radially and join a central hub.

6. The plunger according to claim 1 wherein the frame comprises a plurality of legs that depend from the second end of the frame on a side opposite the first end.

7. The plunger according to claim 1 wherein the filter disc is slidably supported on the posts.

8. The plunger according to claim 1 wherein the filter disc is fixed at the second end of the frame.

9. The plunger according to claim 1 wherein the ring is provided on an inside surface of the ring with a plurality of circumferentially spaced apart inwardly directed projections or tabs.

10. The plunger according to claim 1 further comprising a heat shield disposed over the filter disc and supported by the frame.

11. The plunger according to claim 10 wherein the heat shield comprises first and second disc elements located on opposite sides of the filter disc.

12. The plunger according to claim 11 wherein each of the first and second disc elements includes a plurality of spaced apart openings, wherein the first and second disc elements are juxtaposed so that the openings in the first disc element are radially offset with respect to the openings of the second disc element.

13. The plunger according to claim 1 wherein the particle seal comprises a radial extension of said filter screen.

14. The plunger according to claim 1 wherein the seal is formed separately of said filter screen.

15. The plunger according to claim 12 further comprising a heat shield disposed over the filter disc and supported by the frame.

16. The plunger according to claim 15 wherein the heat shield comprises first and second disc elements located on opposite sides of the filter disc.

17. The plunger according to claim 16 wherein each of the first and second disc elements includes a plurality of spaced apart openings, wherein the first and second elements are juxtaposed so that the openings in the first disc element are radially offset with respect to the openings of the second disc element.

18. A method for brewing a drink from a particulate substance in a vessel having a bottom wall, a side wall extending upward from the bottom wall, and a mouth extending about the side wall, the method comprising:
   providing a plunger comprising a frame having a first end and an axially opposed second end, the first end comprising a ring, a plurality of posts extending from a periphery of the ring and coupling the ring to the second end, and a filter disc coupled to the frame and supporting a filter screen, the filter screen comprising a plurality of holes or pores dimensioned to prevent the passage therethrough of the particulate substance;
   depositing a quantity of a particulate substance into the vessel;
   pouring a liquid into the vessel;
   inserting the plunger into the vessel; and,
   pushing the plunger with a separate implement bearing on the filter disc to a location within the vessel where the plunger is disposed below the mouth of the vessel.

19. The method for brewing a drink according to claim 18 further comprising: adding milk, sugar or other additives to the vessel after the step of pushing the plunger.

20. The method according to claim 19 further comprising the steps of:
   consuming the drink;
   then withdrawing the plunger from the vessel by gripping the ring and pulling on the ring.

21. A plunger and vessel system for brewing a drink from a particulate substance and a liquid, the vessel comprising a bottom wall, a side wall extending upward from the bottom wall and a mouth extending about the side wall through which the plunger is inserted into and withdrawn from the vessel;
   the plunger comprising a filter screen provided with a plurality of holes or pores dimensioned to substantially prevent the passage therethrough of the particulate substance, a frame with a first end and an axially opposed second end, the first end comprising a ring, a plurality of posts extending from a periphery of the ring coupling the ring to the second end, a filter disc coupled to the frame and supporting the filter screen, the filter disc being adapted to receive a separate implement to push the plunger to a bottom of the vessel; and wherein
   the plunger and vessel are relatively dimensioned so that when the plunger is pushed by the implement to a lowest point within the vessel, the frame is disposed below the mouth of the vessel.

22. The plunger and vessel system according to claim 21 further comprising a particle seal extending circumferentially about the filter disc.

23. The plunger and vessel system according to claim 22 wherein the particle seal is comprised of a radial extension of the filter screen.

24. The plunger and vessel system according to claim 22 wherein the seal is formed separately of the filter screen.

25. A plunger according to claim 21 wherein the frame comprises a plurality of nibs on an outer circumferential surface of the frame.

26. The plunger according to claim 21 wherein the filter disc comprises a carrier that supports the filter screen.

27. The plunger according to claim 26 wherein the carrier comprises first and second parts between which the filter screen is retained.

28. The plunger according to claim 27 wherein an upper end of the frame comprises a plurality of spokes that extend radially and join a central hub.

29. The plunger according to claim 21 wherein the frame comprises a plurality of legs that depend from the second end of the frame on a side opposite the first end.

30. The plunger according to claim 21 wherein the filter disc is slidably supported on the posts.

31. The plunger according to claim 21 wherein the filter disc is fixed at the second end of the frame.

32. The plunger according to claim 21 wherein the ring is provided on its inside surface with a plurality of circumferentially spaced apart inwardly directed projections or tabs.

33. A plunger for use in brewing a drink from a particulate substance and a liquid held in a vessel, said vessel having a bottom wall, a side wall extending upward from said bottom wall and a mouth extending about said side wall through which said plunger can be inserted and withdrawn, said plunger comprising:
   a filter shaped to extend across and sealingly abut an inside surface of said side wall of said vessel, said filter provided with a plurality of pores or holes dimensioned to substantially prevent passage therethrough of said particulate substance;
   a frame supporting said filter, said plunger including means for receiving a separate implement, and dimensioned so that when said plunger is pushed by an implement received by said receiving means to a lowest position within said vessel, said frame is disposed below said mouth; and
   wherein the frame is provided with at least one upright post along which said filtering means can slide, and first and second opposite ends between which said at least one post extends wherein said first and second ends retain said filter on said at least one upright post and the sliding of said filter along said at least one upright post is limited by said first and second ends.

34. The plunger according to claim 33 wherein at least one of said first and second ends includes engaging means for engaging an implement or a finger of a user for withdrawing said plunger from said vessel.

35. The plunger according to claim 34 wherein said engaging means includes a plurality of circumferentially spaced apart, radially inwardly directed projections between which said implement can be engaged.

36. The plunger according to claim 33 wherein said first and second ends are each in the general configuration of a ring having a common axis which extends substantially parallel to said at least one upright post.

37. A plunger for use in brewing a drink from a particulate substance and a liquid held in a vessel, said vessel having a bottom wall, a side wall extending upward from said bottom wall and a mouth extending about said side wall through which said plunger can be inserted and withdrawn, said plunger comprising:
   a filter shaped to extend across and sealingly abut an inside surface of said side wall of said vessel, said filter provided with a plurality of pores or holes dimensioned to substantially prevent passage therethrough of said particulate substance;
   a frame supporting said filter, said plunger including means for receiving a separate implement, and dimensioned so that when said plunger is pushed by an implement received by said receiving means to a lowest position within said vessel, said frame is disposed below said mouth; and
   wherein said filter includes a carrier and a filter screen supported by said carrier, and said carrier includes an outer circumferential rim provided with a plurality of apertures through each of which a respective one of said at least one upright post extends.

38. A plunger for use in brewing a drink from a particulate substance and a liquid held in a vessel, said vessel having a bottom wall, a side wall extending upward from said bottom wall and a mouth extending about said side wall through which said plunger can be inserted and withdrawn, said plunger comprising:
   a filter shaped to extend across and sealingly abut an inside surface of said side wall of said vessel, said filter provided with a plurality of pores or holes dimensioned to substantially prevent passage therethrough of said particulate substance;
   a frame supporting said filter, said plunger including means for receiving a separate implement, and dimensioned so that when said plunger is pushed by an implement received by said receiving means to a lowest position within said vessel, said frame is disposed below said mouth; and
   a heat shield disposed over said filtering means and supported by said frame for reducing the rate of heat loss of a hot beverage brewed using said plunger.

39. The plunger according to claim 38 wherein said heat shield includes first and second disc elements located on opposite side of said filtering means.

40. The plunger according to claim 39 wherein each of said disc elements includes a plurality of spaced apart openings, wherein said first and second disc elements are juxtaposed so that the openings of said first disc element are radially offset with respect to said openings of said second disc element.

41. The plunger according to claim 40 wherein said filtering means further includes a seal extending circumferentially about said carrier to form a seal between said carrier and said side wall of said vessel.

42. A plunger for use in brewing a drink from a particulate substance and a liquid held in a vessel, said vessel having a bottom wall, a side wall extending upward from said bottom wall and a mouth extending about said side wall through which said plunger can be inserted and withdrawn, said plunger comprising:
   a filter shaped to extend across and sealingly abut an inside surface of said side wall of said vessel, said filter provided with a plurality of pores or holes dimensioned to substantially prevent passage therethrough of said particulate substance;
   a frame supporting said filter, said plunger including means for receiving a separate implement, and dimensioned so that when said plunger is pushed by an implement received by said receiving means to a lowest position within said vessel, said frame is disposed below said mouth; and
   an agitator rotatably coupled to said filter for agitating a drink in said vessel.

* * * * *